Sept. 6, 1955　　　　　　　W. BADER　　　　　　2,716,799
TOOL HOLDER
Filed Dec. 6 1951
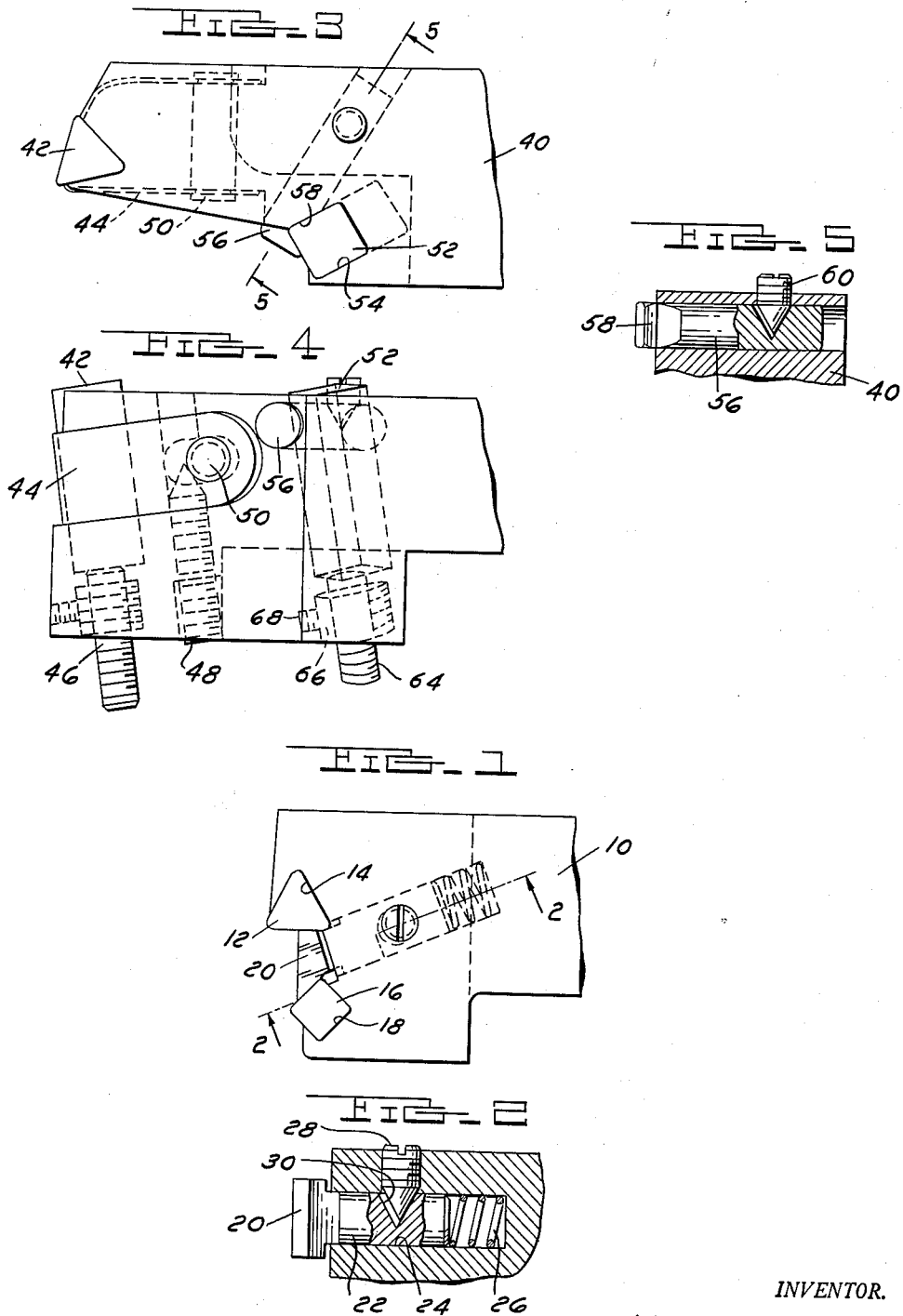
INVENTOR.
WILLIAM BADER
BY
Barnes, Kisselle, Laughlin & Raisch
ATTORNEYS ID: United States Patent Office — 2,716,799 — Patented Sept. 6, 1955

2,716,799
TOOL HOLDER

William Bader, Birmingham, Mich., assignor to Wesson Multicut Company, Ferndale, Mich., a corporation of Michigan Application December 6, 1951, Serial No. 260,173

1 Claim. (Cl. 29—96)

This invention relates to a tool holder.

A tool holder of the general type to be described is disclosed in detail in my co-pending application Serial No. 176,733, now Patent No. 2,624,103, granted January 6, 1953. In that application a band type holder for solid tungsten carbide inserts is disclosed. The tool holding device to be disclosed herein may supplement said band type holder in difficult special tool arrangements and may also be used as a separate and independent insert holder when desired.

Briefly, the invention consists of what may be called a draw bar type of holder, that is, a bar which is slidable within the body of the tool and which has a head shaped to co-operate with at least one surface of a carbide insert to hold the insert within a recess in the tool body. Means is provided to pull back on the draw bar to provide the necessary compression on the insert to hold it rigidly in its recess.

Drawings accompany the disclosure, and the various views thereof may be briefly described as:

Figure 1, a plan view of a tool holder showing the device applied to the holding of two carbide inserts.

Figure 2, a sectional view on line 2—2 of Figure 1.

Figure 3, a plan view of a tool holder using a combination band type and draw bar fastening device.

Figure 4, a side elevation of the tool shown in Figure 3.

Figure 5, a sectional view showing the draw bar type of holder.

Referring to the drawings, in Figure 1 a tool holder body 10 is shown with two carbide inserts shown in end elevation consisting of a triangular insert 12 held in a recess 14 and a square insert 16 held in a recess 18.

A draw bar 20 has a nose shaped to exert pressure simultaneously on the two inserts 14 and 16. The draw bar has an enlarged head which extends wider than the shaft 22, on which it is formed, in all directions to exert as much bearing force on the carbide inserts as is required.

The shaft 22 slides in a recess 24 and is resiliently backed by a spring 26. A cone-shaped set screw 28 co-operates with a cone-shaped recess 30 to force the draw bar back into the recess and thereby apply pressure to the carbide inserts 12 and 16.

In Figure 3 a tool holder 40 is shown having a triangular insert 42 held in place by a band 44. A backing screw 46 locates the insert, and the tension of the band is controlled by a conically ended set screw 48 acting on a cross bar 50. These parts are defined in detail in the previously mentioned application Serial No. 176,733.

The tool body 40 is the type that requires two carbide inserts for a double cut, and the second insert 52 has a square cross section and is held in a recess 54 which is broached into the tool body at the proper angle.

A draw bar type of holder 56 consists of a round plunger having a portion 58 cut away to receive one corner of the square carbide insert 52. A conically ended set screw 60 is inserted through the tool body at the top to pull the shaft or shank 56 back into the tool body to exert holding pressure on the insert 52 within its broached recess. At the bottom of the insert 52 is an adjustable backing screw 64 threaded into a threaded insert 66 held in place by a lock screw 68.

It will be seen that the present device may be applied to all shapes of tool holders and carbide inserts, the basic concept being a draw bar which pulls back into the tool body by a mechanical action and a head on the draw bar shaped to contact a portion of the surface of the insert to draw it back into the recess in the tool body provided for the insert. Thus it is possible to exert a strong pulling force on the insert to back it solidly into a confining recess in the tool body.

What I claim is:

A tool holder comprising a body having two substantially parallel spaced, broached recesses to receive cutter inserts, cutter inserts in said recesses having facing spaced walls and a holder for said inserts comprising a member having a shaft slidable in an opening within said tool body in a direction substantially normal to the axis of the recesses and a shaped portion on the end of said holder having diverging walls on opposite sides to correspond with walls of said recesses and said inserts to contact cutter inserts and force said inserts in opposite directions into said recesses against the tool body.

References Cited in the file of this patent

UNITED STATES PATENTS

| | | |
|---|---|---|
| 1,918,642 | Hall | July 18, 1933 |
| 2,492,797 | Guetzkow | Dec. 27, 1949 |
| 2,641,049 | Kennicott | June 9, 1953 |

FOREIGN PATENTS

| | | |
|---|---|---|
| 372,704 | Great Britain | May 12, 1932 |
| 494,973 | Germany | Mar. 31, 1930 |